US009761292B2

(12) United States Patent
Seol et al.

(10) Patent No.: US 9,761,292 B2
(45) Date of Patent: Sep. 12, 2017

(54) FLASH MEMORY DEVICE, FLASH MEMORY SYSTEM, AND METHODS OF OPERATING THE SAME DURING AN AUTHENTICATION CHALLENGE

(71) Applicant: SAMSUNG ELECTRONICS CO., LTD., Suwon-si, Gyeonggi-do (KR)

(72) Inventors: Chang-Kyu Seol, Osan-si (KR); Seong-Hyeog Choi, Hwaseong-si (KR); Jun-Jin Kong, Yongin-si (KR); Hong-Rak Son, Anyang-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 161 days.

(21) Appl. No.: 14/693,300

(22) Filed: Apr. 22, 2015

(65) Prior Publication Data

US 2015/0317257 A1  Nov. 5, 2015

(30) Foreign Application Priority Data

Apr. 30, 2014  (KR) ........................ 10-2014-0052980

(51) Int. Cl.
*G06F 12/14* (2006.01)
*H04L 9/32* (2006.01)
(Continued)

(52) U.S. Cl.
CPC ............ *G11C 7/24* (2013.01); *G06F 11/1016* (2013.01); *G06F 11/1044* (2013.01);
(Continued)

(58) Field of Classification Search
CPC .............. G11C 7/24; G11C 2029/0411; G11C 2029/5004; G06F 11/1016; G06F 11/1044;
(Continued)

(56) References Cited

U.S. PATENT DOCUMENTS

| 6,446,177 B1 | 9/2002 | Tanaka et al. |
| 7,093,139 B2 | 8/2006 | Silverbrook et al. |

(Continued)

FOREIGN PATENT DOCUMENTS

JP  2012-073954  4/2012

*Primary Examiner* — Albert Decady
*Assistant Examiner* — Christian Dorman
(74) *Attorney, Agent, or Firm* — F. Chau & Associates, LLC

(57) ABSTRACT

Provided are a flash memory device, a flash memory system, and methods of operating the same. A method of operating a flash memory system includes selecting memory cells of a flash memory in response to an authentication challenge, programming pieces of input data into the selected memory cells, respectively, reading the selected memory cells and generating and storing control information, dividing the selected memory cells into at least one first region memory cell and at least one second region memory cell based on the control information, and setting read values of the at least one first region memory cell and the at least one second region memory cell as a first value and a second value, respectively, and generating an authentication response in the response to the authentication challenge.

14 Claims, 14 Drawing Sheets

(51) Int. Cl.
*G06F 11/10* (2006.01)
*G11C 29/50* (2006.01)
*G06F 21/31* (2013.01)
*G06F 12/02* (2006.01)
*G11C 7/24* (2006.01)
*G11C 29/04* (2006.01)

(52) U.S. Cl.
CPC ...... *G06F 11/1068* (2013.01); *G06F 11/1072* (2013.01); *G06F 12/0246* (2013.01); *G06F 12/1425* (2013.01); *G06F 21/31* (2013.01); *G11C 29/50004* (2013.01); *H04L 9/32* (2013.01); *H04L 9/3278* (2013.01); *G06F 2212/1052* (2013.01); *G06F 2212/7201* (2013.01); *G11C 2029/0411* (2013.01); *G11C 2029/5004* (2013.01)

(58) Field of Classification Search
CPC ............. G06F 11/1068; G06F 11/1072; G06F 12/0246; G06F 12/14; G06F 12/1416; G06F 12/1425; G06F 12/1433; G06F 12/1441; G06F 21/30; G06F 21/31; G06F 21/70; G06F 21/71; G06F 21/75; G06F 2212/1052; G06F 2212/7201; G06F 3/062; G06F 3/0622; H04L 9/3276; H04L 9/3278

See application file for complete search history.

(56) References Cited

U.S. PATENT DOCUMENTS

| | | |
|---|---|---|
| 7,325,090 B2 | 1/2008 | Ronen |
| 8,051,293 B2 | 11/2011 | Calhoon et al. |
| 9,279,850 B1* | 3/2016 | Pedersen ............ H03K 19/003 |
| 2011/0317829 A1 | 12/2011 | Ficke et al. |
| 2012/0002803 A1 | 1/2012 | Adi et al. |
| 2012/0066571 A1 | 3/2012 | Marinet |
| 2012/0072737 A1* | 3/2012 | Schrijen ............... H04L 9/3278 713/189 |
| 2014/0281828 A1* | 9/2014 | Micheloni ............... G06F 11/00 714/773 |
| 2015/0055417 A1* | 2/2015 | Kim ..................... G11C 16/10 365/185.19 |
| 2015/0070979 A1* | 3/2015 | Zhu ....................... G09C 1/00 365/158 |
| 2016/0328578 A1* | 11/2016 | Plusquellic ............ G06F 21/75 |

\* cited by examiner

FIG. 9B

|  | A | B |  | C |  | D |  | E |  |
|---|---|---|---|---|---|---|---|---|---|
| 1st read | 1 | 0 | 0 | 1 | 1 | 0 | 1 | 1 | 1 |
| 2nd read | 1 | 0 | 0 | 0 | 1 | 1 | 1 | 0 | 1 |
| 3rd read | 1 | 0 | 0 | 0 | 1 | 0 | 1 | 1 | 1 |
| 4th read | 1 | 0 | 0 | 0 | 1 | 1 | 1 | 1 | 1 |

⋮

| nth read | 1 | 0 | 0 | 1 | 1 | 0 | 1 | 0 | 1 |

- - - - - - - - - - - - - - - - - - - - - - - - - - - - - - - - - - - -

| Majority voting | 1 | 0 | 0 | 0 | 1 | 0 | 1 | 1 | 1 |

FLASH MEMORY DEVICE, FLASH MEMORY SYSTEM, AND METHODS OF OPERATING THE SAME DURING AN AUTHENTICATION CHALLENGE

CROSS-REFERENCE TO RELATED APPLICATION

This application claims priority to Korean Patent Application No. 10-2014-0052980, filed on Apr. 30, 2014, in the Korean Intellectual Property Office, the disclosure of which is incorporated by reference in its entirety herein.

BACKGROUND

Technical Field

The inventive concept relates to a flash memory device, a flash memory system, and methods of operating the same, and more particularly, to a flash memory device and a flash memory system, which output an authentication response, and methods of operating the same.

Discussion of Related Art

A physical unclonable function (PUF) implements challenge-response authentication, where one party presents a question ("challenge") and another party must provide a proper answer ("response") to be authenticated. Each time the same authentication challenge is used for a specific device, it may be difficult to consistently output the same authentication response. In particular, when a PUF is utilized based on properties of cells of a flash memory, it may be difficult to output the same authentication response each time the same authentication challenge is used.

SUMMARY

At least one embodiment of the inventive concept provides a flash memory device and a flash memory system, which may output the same authentication response each time the same authentication challenge is used, and methods of operating the same.

According to an exemplary embodiment of the inventive concept, there is provided a method of operating a flash memory system. The method includes selecting memory cells of a flash memory in response to an authentication challenge, programming pieces of input data into the selected memory cells, respectively, reading the selected memory cells to generate control information, dividing the selected memory cells into at least one first region memory cell and at least one second region memory cell based on the control information, and setting read values of the at least one first region memory cell and the at least one second region memory cell to a first value and a second value, respectively, and generating an authentication response in the response to the authentication challenge based on the set values.

The pieces of input data may be the same as one another, and each of the pieces of input data may be at least one bit.

The reading of the selected memory cells to generate the control information may include reading the selected memory cells using a first read voltage, and storing information indicating which cells among the selected memory cells have a threshold voltage higher or lower than the first read voltage, as the control information.

The dividing of the selected memory cells into the first region memory cell and the second region memory cell based on the control information may include setting a memory cell among the selected memory cells having a lower threshold voltage than the first read voltage, as the first region memory cell, setting a memory cell among the selected memory cells having a higher threshold voltage than the first read voltage, as the second region memory cell, and re-programming the second region memory cell to increase a threshold voltage of the second region memory cell.

The setting of the read values of the at least one first region memory cell and the at least one second region memory cell to the first value and the second value, respectively, and the generating of the authentication response in the response to the authentication challenge may include setting the read values of the at least one first region memory cell and the at least one second region memory cell to the first value and the second value, respectively, using a second read voltage higher than a threshold voltage of the at least one first region memory cell and lower than the threshold voltage of the at least one second region memory cell.

The reading of the selected memory cells to generate the control information may include reading the selected memory cells at least twice to generate at least two read values as the control information. Herein, the dividing of the selected memory cells into the at least one first region memory cell and the at least one second region memory cell based on the control information may include setting at least one memory cell, which is read at least twice to generate a constant read value, as the at least one first region memory cell, and setting at least one memory cell, which is read at least twice to generate a varying read value, as the at least one second region memory cell. Also, the setting of the read values of the at least one first region memory cell and the at least one second region memory cell to the first value and the second value, respectively, and the generating of the authentication response in the response to the authentication challenge may include setting the constant read value of the at least one first region memory cell to the first value, and setting a read value making up a predetermined percentage or higher from among read values of the at least one second region memory cell, to the second value.

The reading of the selected memory cells, the generating of the control information, and the dividing of the selected memory cells into at least one first region memory cell and at least one second region memory cell based on the control information may include reading the selected memory cells at least twice, setting at least one memory cell, which is read at least twice to generate a constant read value among the selected memory cells, as the at least one first region memory cell, and setting at least one memory cell, which is read at least twice to generate a varying read value among the selected memory cells, as the at least one second region memory cell. The dividing of the selected memory cells into the at least one first region memory cell and the at least one second region memory cell based on the control information may include setting the constant read value of the at least one first region memory cell to the first value, correcting an error in the varying read value of the at least one second region memory cell based on the control information, error-correction-code (ECC)-decoding the corrected varying read value of the at least one second region memory cell, and setting an ECC-decoded result value to the second value. The control information may include information indicating variations in respective read values of the selected memory cells based on one of the respective read values of the selected memory cells, and the respective read values of the selected memory cells are obtained by the reading of the selected memory cells at least twice.

The correcting of the error in the varying read value of the at least one second region memory cell based on the control information may include correcting an error vector of the read value of the at least one second region memory cell and setting the corrected error vector to an ECC code word.

The programming of the pieces of input data into the selected memory cells, respectively, may further include determining slow cells. The dividing of the selected memory cells into the at least one first region memory cell and the at least one second region memory cell based on the control information may include dividing the determined slow cells into the at least one first region memory cell and the at least one second region memory cell.

The determining of the slow cells may include reading the respective memory cells in which the pieces of the input data are programmed, using a first read voltage at least once, comparing the pieces of the input data with read values of each of the memory cells read at the first read voltage each time the memory cells are read, and determining the slow cells based on the comparison results.

The method may further include programming pieces of the same input data into each of the memory cells at least once. The reading of the selected memory cells and the generating of the control information may include reading respective slow cells in which the pieces of the input data are programmed using a first read voltage each time the pieces of the same data are programmed into each of the memory cells, and calculating a sum of generated read values of the respective slow cells to store the control information each time the determined slow cells are read. The dividing of the selected memory cells into the at least one first region memory cell and the at least one second region memory cell based on the control information may include setting at least one slow cell having read values of which a sum is smaller than a sum of read values of a reference slow cell having a specific threshold voltage among the slow cells, as the at least one first region memory cell, and setting at least one slow cell having read values of which the sum is larger than the sum of the read values of the reference slow cell having the specific threshold voltage among the slow cells, as the at least one second region memory cell.

According to an exemplary embodiment of the inventive concept, there is provided a method of preventing physical cloning by using a flash memory. The method includes transmitting, by a source external to the flash memory, an authentication challenge to the flash memory, selecting memory cells of the flash memory based on the authentication challenge, programming pieces of the same input data into each of the memory cells, reading the selected memory cells to generate control information, dividing the selective memory cells into at least one first region memory cell and at least one second memory cell based on the control information, and setting read values of the at least one first region memory cell and the at least one second region memory cell to a first value and a second value, respectively, based on the control information, and generating an authentication response in the response to the authentication challenge based on the set values.

The reading of the selected memory cells to generate the control information may include reading the selected memory cells using a first read voltage, and storing information indicating which cells among the selected memory cells have a threshold voltage higher or lower than the first read voltage, as the control information. The dividing of the selected memory cells into the first region memory cell and the second region memory cell based on the control information may include setting a memory cell which is among the selected memory cells and has a lower threshold voltage than the first read voltage, as the first region memory cell, setting a memory cell which is among the selected memory cells and has a higher threshold voltage than the first read voltage, as the second region memory cell, and re-programming the second region memory cell to increase a threshold voltage of the second region memory cell. The setting of the read values of the at least one first region memory cell and the at least one second region memory cell to the first value and the second value, respectively, based on the control information comprises setting the read values of the at least one first region memory cell and the at least one second region memory cell to the first value and the second value, respectively, using a second read voltage.

The reading of the selected memory cells and the generating of the control information may include reading the selected memory cells at least twice to generate at two read values, and storing the at least two read values as the control information. The dividing of the selected memory cells into the at least one first region memory cell and the at least one second region memory cell based on the control information may include setting at least one memory cell, which is read at least twice to generate a constant read value, as the at least one first region memory cell, and setting at least one memory cell, which is read at least twice to generate a varying read value, as the at least one second region memory cell. The setting of the read values of the at least one first region memory cell and the at least one second region memory cell as the first value and the second value, respectively, based on the control information may include setting the constant read value of the at least one first region memory cell to the first value, and setting a read value making up a predetermined percentage or higher, among read values of the at least one second region memory cell, to the second value.

The programming of the pieces of the input data in the respective selected memory cells may include reading memory cells in which the pieces of the input data are programmed, using a first read voltage at least once, comparing the pieces of the input data with the read values of the read memory cells which correspond to the pieces of data and into which the pieces of data are to be respectively programmed using the first read voltage, each time the selected memory cells are read, and determining slow cells based on the comparison results. The reading of the selected memory cells to generate the control information may include reading respective slow cells corresponding to pieces of data programmed into the slow cells using a first read voltage each time the input data is programmed into the respective memory cells, and calculating a sum of generated read values of the respective slow cells to store the control information each time the determined slow cells are read. The dividing of the selected memory cells into the at least one first region memory cell and the at least one second region memory cell based on the control information may include setting at least one slow cell having read values of which a sum is smaller than a sum of read values of a reference slow cell having a specific threshold voltage among the slow cells, as the at least one first region memory cell, and setting at least one slow cell having read values of which a sum is larger than the sum of the read values of the reference slow cell having the specific threshold voltage among the slow cells, as the at least one second region memory cell.

According to an exemplary embodiment of the inventive concept, a method of operating a flash memory system includes: selecting, by a controller of the system, memory cells of the flash memory in response to an authentication challenge; programming, by the controller, data into the selected memory cells; reading, by the controller, the selected memory cells multiple times to generate a history of read values; determining, by the controller, which of the selected memory cells have a constant value and a variable value based on the history; setting a first value for each memory cell determined to have the constant value to a value from the corresponding memory cell; setting a second value for each memory cell determined to have the variable value to a constant value; and generating an authentication response comprising the first values and the second values.

The setting of the second value may include determining which of first logic level and a second logic level occurs more often than a certain percentage in the history for a corresponding one of the memory cells determined to have the variable value, and setting the second value for the one memory cell to the logic level that is determined to occur more often than the percentage. The percentage may be 50 percent. Each reading may include applying a read voltage to each of the selected memory cells and setting the read value for each memory cell to one of a first logic level and a second logic level based on whether a threshold voltage of the corresponding memory cell is higher or lower than the applied read voltage. The generating of the authentication response may include appending the first values and the second values according to an order in which the memory cells are selected.

BRIEF DESCRIPTION OF THE DRAWINGS

Exemplary embodiments of the inventive concept will be more clearly understood from the following detailed description taken in conjunction with the accompanying drawings in which:

FIG. 9B is a diagram showing a table of the majority voting method shown in FIG. 9A;

DETAILED DESCRIPTION

Figure 1:
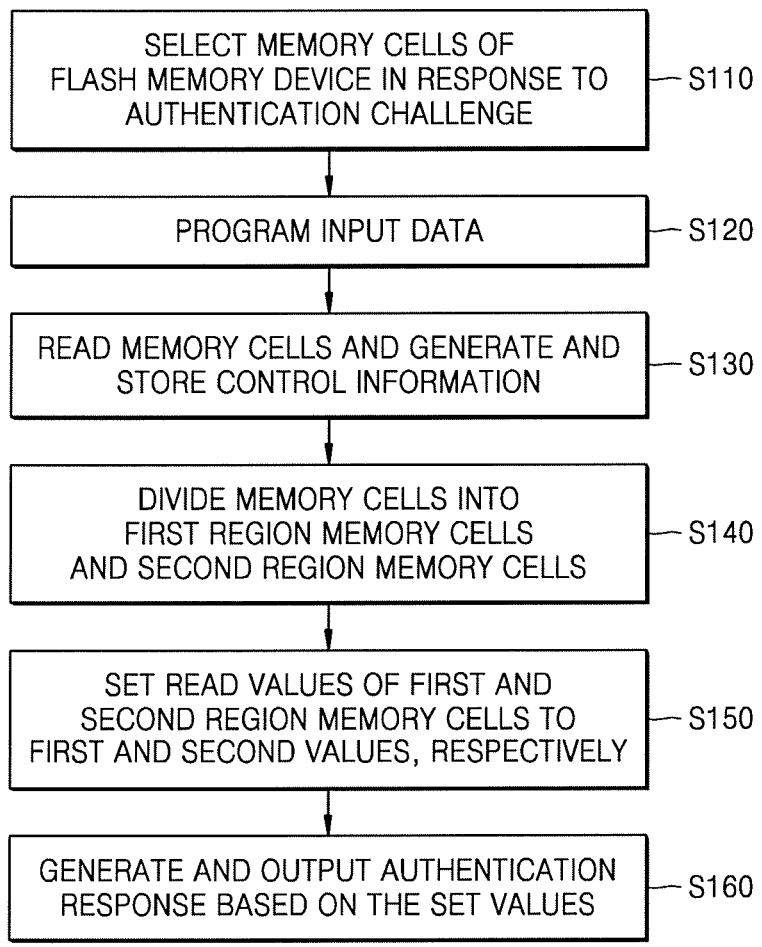
FIG. 1 is a flowchart illustrating a method of operating a flash memory system according to an exemplary embodiment of the inventive concept.

The present inventive concept will now be described more fully hereinafter with reference to the accompanying drawings, in which exemplary embodiments of the inventive concept are shown. These embodiments are provided so that this disclosure is thorough and complete and fully conveys the scope of the inventive concept to one skilled in the art. Like reference numerals refer to like elements throughout. In the drawings, the thicknesses of layers and regions may be exaggerated for clarity. As used herein, the singular forms "a", "an", and "the" are intended to include the plural forms as well, unless the context clearly indicates otherwise.

FIG. 1 is a flowchart illustrating a method of operating a flash memory system according to an exemplary embodiment of the inventive concept.

Referring to FIG. 1, the method of operating the flash memory system includes selecting memory cells of a flash memory device (S110), programming input data (S120), reading memory cells to generate and store control information (S130), dividing the selected memory cells into at least one first region memory cell and at least one second region memory cell (e.g., based on the control information) (S140), setting read values of the first region memory cell and the second region memory cell to a first value and a second value, respectively (S150), and generating and outputting an authentication response based on the set values (S160). Operation S110 may be performed by selecting specific cells out of the memory cells of the flash memory device in response to the flash authentication challenge. In an embodiment of the inventive concept, the flash memory system includes a controller and the flash memory device, and the authentication challenge is generated by the controller and output from the controller to the flash memory device. When the flash memory system includes a plurality of flash memory devices, respectively different authentication challenges may be output to the flash memory devices, and the same authentication challenge may be output to a specific flash memory device each time. Respective memory cells included in the flash memory device may have different characteristics in response to an authentication challenge. For example, even if the memory cells are programmed at the same program voltage, a different threshold voltage dispersion may be obtained according to physical properties of the memory cells. Since this characteristic depends on each of the flash memory devices, each of the flash memory devices may be authenticated using the characteristic.

To program proper data into each of the flash memory devices, specific memory cells may be selected. For example, the specific memory cells may be memory cells disposed in a region in which metadata is stored, among a memory cell array of a flash memory device. In an embodiment, at least one memory cell is selected in various manners using a word line address, a block address, a page address, and a bit line address, according to the units of memory cells required for a specific authentication challenge. Operation S120 may be performed by programming pieces (e.g., parts, bits, etc.) of the input data into the selected specific memory cells. In an embodiment, the pieces of input data respectively programmed into the specific memory cells are the same data as one another. In an embodiment, each of the pieces of input data is at least one bit. In an exemplary embodiment, to program the input data, the input data is initially set in a page buffer included in the flash memory device, and the input data set in the page buffer is then programmed into the specific memory cells. Even if the same input data is programmed into the specific memory cells, the specific memory cells may have respectively different threshold voltages due to respective proper characteristics thereof.

A flash memory may store information in array of memory cells made from floating-gate transistors. Each memory cell may resemble a standard MOSFET, except the transistor has two gates instead of one. In an embodiment, on top is the control gate, as in other MOS transistors, but below this there is a floating gate insulated all around by an insulating layer (e.g., an oxide layer). In an embodiment, the floating gate is interposed between the control gate and the MOSFET channel. Placing electrons on the floating gate sets the transistor to the logical "0" state. Once the floating gate is charged the electrons in it screen the electric field from control gate, thus increasing the threshold voltage (the first threshold voltage) of the cell with no charged floating gate to a higher threshold voltage (the second threshold voltage). In order to read a value from the transistor, an intermediate or median voltage between the two threshold voltages is applied to the control gate. If the channel conducts at this intermediate voltage, it indicates that a logical "0" is stored in the cell, and if the channel does not conduct at this voltage, it indicates that a logic "1" is stored. If the cell is a multi-level cell rather than a single-level cell, the amount of current flow within the channel rather than simply its presence or absence is used to determine more precisely the state of the cell. Ideally, the transition voltages of each cell are the same, but in practice they can vary from one another.

In operation S130, the specific memory cells, which have proper threshold voltage dispersions, are read by application of a read voltage to generate read values, and the control information is generated based on the generated read values. For example, the read voltage may be applied at the intermediate voltage level to the control gate of each of the selected cells to determine their states. The specific memory cells, which have the proper threshold voltage dispersions may be those cells who transistor voltages are within a certain voltage range. The read voltage may be a median value among threshold voltages of the specific memory cells. For example, the read voltage may be the intermediate voltage between the first and second transition voltages. A detailed description of the median value in the threshold voltages will be presented below. The control information may be variously generated based on the read values according to various embodiments of the inventive concept. The control information may be stored in a storage unit, such as a register, which is included in the flash memory system. By use of the control information, one flash memory device may be controlled to output the same authentication response each time the same authentication challenge is used. Embodiments related with the control information will be described in detail below.

Based on the control information, the programmed memory cells are divided into at least one first region memory cell and at least one second region memory cell (S140). The control information by which the programmed memory cells are divided into the first region memory cell and the second region memory cell may vary according to embodiments of the inventive concept. Also, the first region memory cell and the second region memory cell may be differently defined based on control information according to each embodiment. This will be described in detail later. In operation S150, read values of the first region memory cells and the second region memory cells are set to a first value and a second value, respectively. The first and second values may vary according to embodiments of the inventive concept. Also, the read value of the first region memory cells may be set to the first value, and the read value of the second region memory cells may be set to the second value. This operation may be performed to generate the same authentication response in response to an authentication challenge.

In operation S160, an authentication response is generated based on at least one of the set values. For example, after the specific memory cells are divided into the first region memory cells and the second region memory cells, when the read values of the first region memory cells are set to the first value and the read values of the second region memory cells are set to the second value, the authentication response is a combination (e.g., appending) of the first value and the second value to which the read values of the respective specific memory cells are set. However, in other embodiments, the authentication response is generated only by the first value or only by the second value. According to an exemplary embodiment of the inventive concept, the same authentication response is generated each time the same authentication challenge is used in the same flash memory device, and different flash memory devices generate different authentication responses and are utilized for a method of preventing physical cloning and maintaining security.

Figure 2:
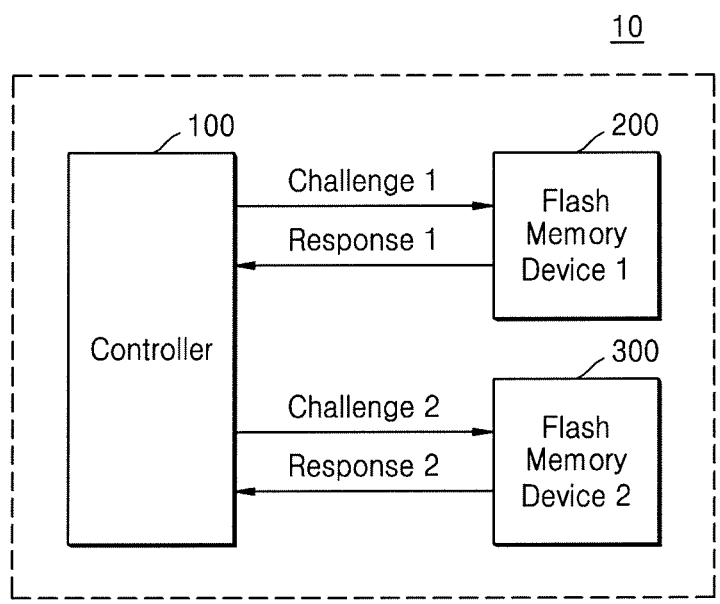
FIG. 2 is a block diagram of a flash memory system according to an exemplary embodiment of the inventive concept.

FIG. 2 is a block diagram of a flash memory system 10 according to an exemplary embodiment of the inventive concept.

Referring to FIG. 2, the flash memory system 10 includes a controller 100, a first flash memory device 200, and a second flash memory device 300. According to exemplary embodiments of the inventive concept, the flash memory system 10 may further include third and fourth flash memory devices, or additional memory devices. The method of operating the flash memory system, which is illustrated in FIG. 1, may be embodied in the flash memory system 10. For example, the method may be embodied as computer executable instructions stored in a flash memory device of the flash memory system 10. The controller 100 may be a flash memory controller 100 configured to control operations of a flash memory device. The controller 100 may provide various control signals to the first flash memory device 200 and the second flash memory device 300 and control the operations of the flash memory device. For example, the controller 100 transmits a first authentication challenge challenge1 to the first flash memory device 200, and transmits a second authentication challenge challenge2 to the second flash memory device 300. In response to the first authentication challenge1, the first flash memory device 200 transmits a first authentication response response1 to the controller 100. Also, in response to the second authentication challenge2, the second flash memory device 300 transmits a second authentication response response2 to the controller 100.

According to an exemplary embodiment of the inventive concept, the flash memory system 10 controls the same first authentication response response1 to be provided in response to the first authentication challenge challenge1, and controls the same second authentication response response2 to be provided in response to the second authentication challenge challenge2. In an embodiment, the first authentication challenge challenge1 and the second authentication challenge challenge2 are the same signals In an embodiment, the flash memory system 10 controls the first authentication response response1 and the second authentication response response2 to be different from each other.

In addition to the first authentication challenge challenge1 and the second authentication challenge challenge2, the controller 100 may provide a control signal CS (not shown) for controlling read values of programmed memory cells to be set to a constant value, to the first flash memory device 200 and the second flash memory device 300. In response to the control signal CS, the first flash memory device 200 and the second flash memory device 300 may provide a control information signal CIS (not shown) to the controller 100. In an embodiment of the inventive concept, the control signal CS and the control information signal CIS are stored in the first flash memory device 200 and the second flash memory device 300, respectively. For example, the control signal CS and the control information signal CIS may be respectively stored in control information storage units (not shown) included in the first flash memory device 200 and the second flash memory device 300. Also, the control signal CS and the control information signal CIS may be transmitted and received by control logics (not shown) included in the first flash memory device 200 and the second flash memory device 300. The same authentication response may be generated and output by the flash memory system 10 by which the operating method shown in FIG. 1 is embodied, in response to an authentication challenge.

Figure 3:
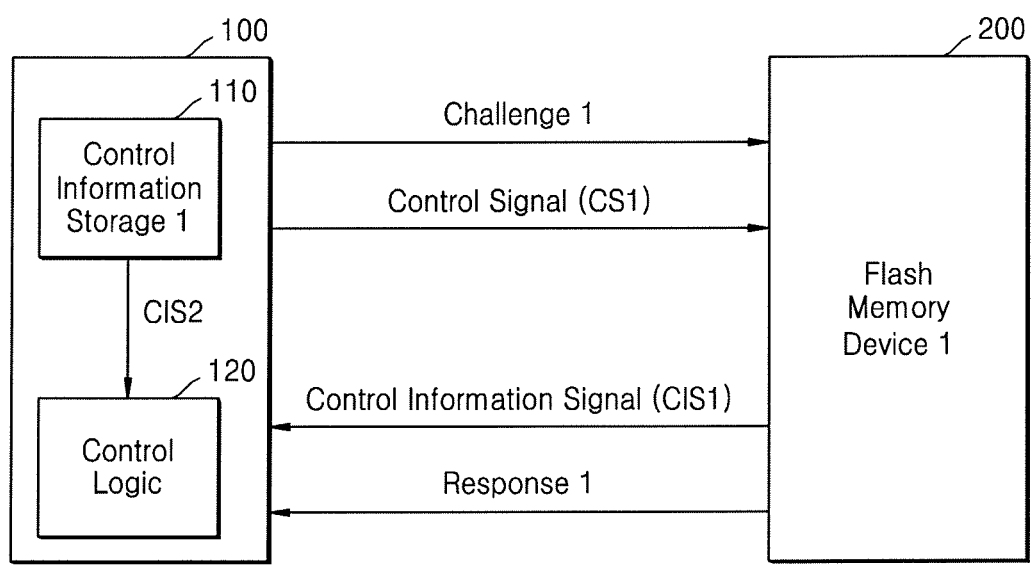
FIG. 3 is a block diagram of a controller according to an exemplary embodiment of the inventive concept.

FIG. 3 is a block diagram of the controller 100 of FIG. 2, according to an exemplary embodiment of the inventive concept.

Referring to FIG. 3, the controller 100 includes a control information storage unit 110 and a control logic 120. The controller 100 according to an exemplary embodiment of the inventive concept provides a first authentication challenge challenge1 and a control signal CS1 to a first flash memory device 200, and a first authentication response response1 and a control information signal CIS1 from the first flash memory device 200 are provided to the controller 100. In response to the first authentication challenge challenge1, at least one memory cell included in the first flash memory device 200 is selected, and input data is programmed into each selected memory cell. In an exemplary embodiment, all the input data is the same (e.g., "0"). The memory cells may be read to generate read values by applying a read voltage to the memory cells, and control information may be generated from the read values. The first flash memory device 200 may provide a control information signal CIS1 to transmit control information to the controller 100.

The controller 100 may receive control information signal CIS1, and store related control information in the control information storage unit 110. A configuration of the control information storage unit 110 may vary according to embodiments of the inventive concept, and detailed descriptions thereof will be presented below. The control information storage unit 110 may provide a control information signal CIS2 to transmit stored control information to the control logic 120. However, in an exemplary embodiment, the control logic 120 transmits a signal for requesting control information to the control information storage unit 110, and the control information storage unit 110 provides a control information signal CIS2 to the control logic 120 in response to the signal.

The control logic 120 may provide the control signal CS1 to the first flash memory device 200 based on the received control information. The first flash memory device 200 may control the read value of the programmed memory cells to be a constant value based on the control signal CS1, and generate a consistent first authentication response response1. The first flash memory device 200 may provide the first authentication response response1 to the controller 100. However, the present embodiments are not limited to the first flash memory device 200 and may also be applied to other flash memory devices, such as second and third flash memory devices.

Figure 4:
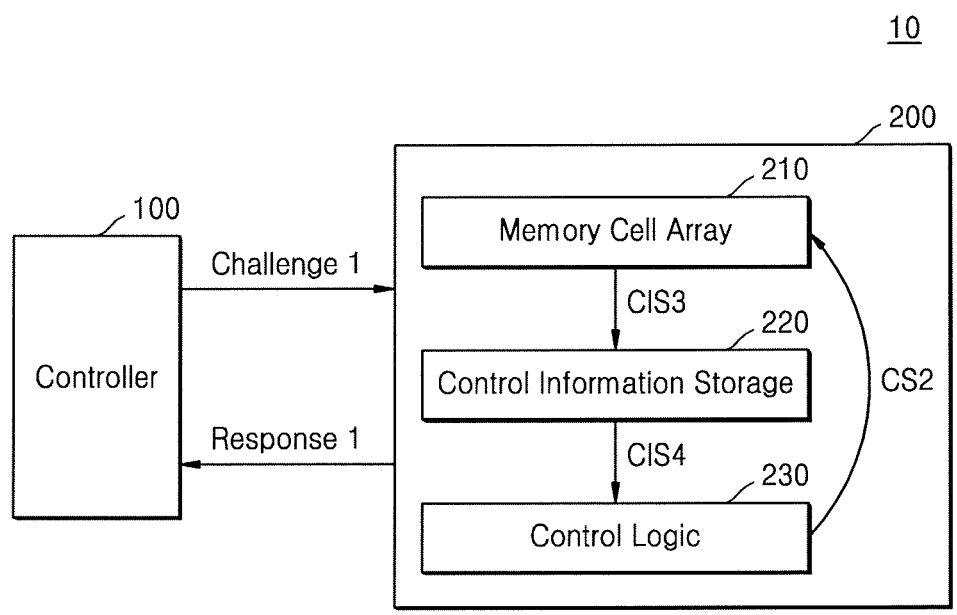
FIG. 4 is a block diagram of a first flash memory device 200 according to an exemplary embodiment of the inventive concept.

FIG. 4 is a block diagram of a flash memory device 200 according to an exemplary embodiment of the inventive concept.

Referring to FIG. 4, the first flash memory device 200 includes a memory cell array 210, a control information storage unit 220, and a control logic 230. The controller 100 provides a first authentication challenge challenge1 to the first flash memory device 200. The first flash memory device 200 selects memory cells of the memory cell array 210 based on the received first authentication challenge challenge1. Different memory cells may be selected in response to the first authentication challenge challenge1. After input data is programmed into the selected memory cells, control information may be generated based on a read value obtained by reading the input data with application of a read voltage. A third control information signal CIS3 including control information may be provided from the memory cell array 210 to the control information storage unit 220 so that the control information can be stored in the control information storage unit 220. In an embodiment, the control logic 230 controls generation of the control information.

The control information storage unit 220 provides a fourth control information signal CIS4 to the control logic 230. The control logic 230, which has received the fourth control information signal CIS4, provides a second control signal CS2 for controlling the selected memory cells based on control information to the memory cell array 210. For example, the second control signal CS2 may be a control signal for controlling a voltage level of a read voltage or the number of times a read operation is performed. According to various embodiments of the inventive concept, the second control signal CS2 may be variously set, and a method of controlling memory cells may be variously embodied according to the set second control signal CS2. Specific memory cells may be controlled to set a read value to be a constant value, and the first authentication response response1 may be generated based on the constant value and provided to the controller 100. However, the present embodiments are not limited to the first flash memory device 200 and may also be applied to other flash memory devices, such as second and third flash memory devices.

Figure 5:
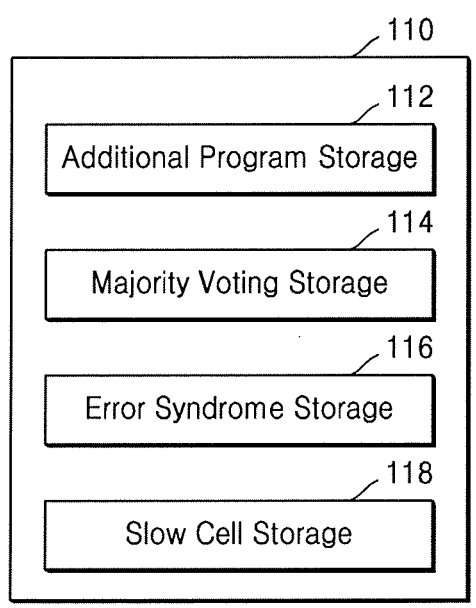
FIG. 5 is a block diagram of a control information storage unit of FIG. 3, according to an exemplary embodiment of the inventive concept.

FIG. 5 is a block diagram of the control information storage unit 110 of FIG. 3, according to an exemplary embodiment of the inventive concept.

Referring to FIG. 5, the control information storage unit 110 may include at least one of an additional program storage unit 112, a majority voting storage unit 114, an error syndrome storage unit 116, and a slow cell storage unit 118.

However, in an embodiment of the inventive concept, the control information storage unit 110 is included in the flash memory device 200 of FIG. 4.

Figure 8A:
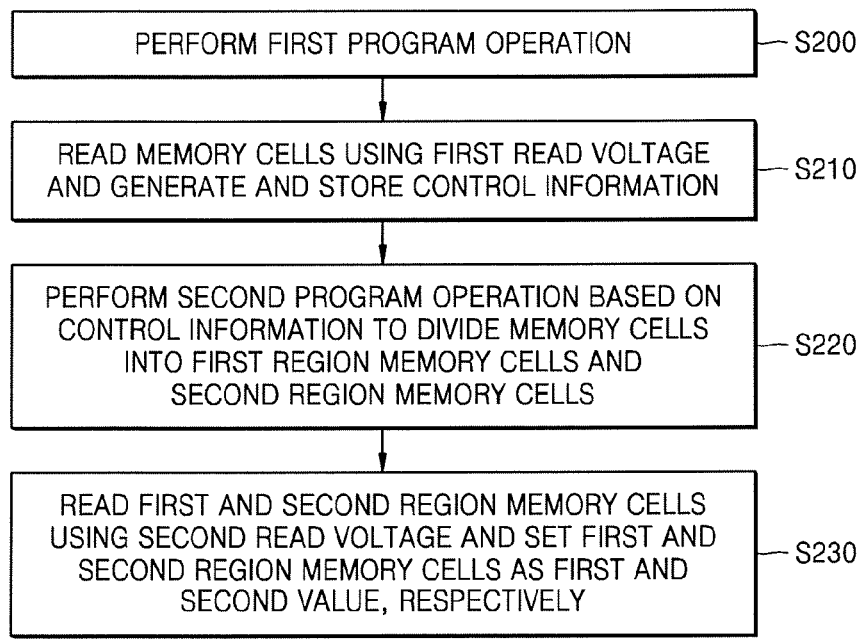
FIG. 8A is a flowchart illustrating an additional program method according to an exemplary embodiment of the inventive concept.
Figure 9A:
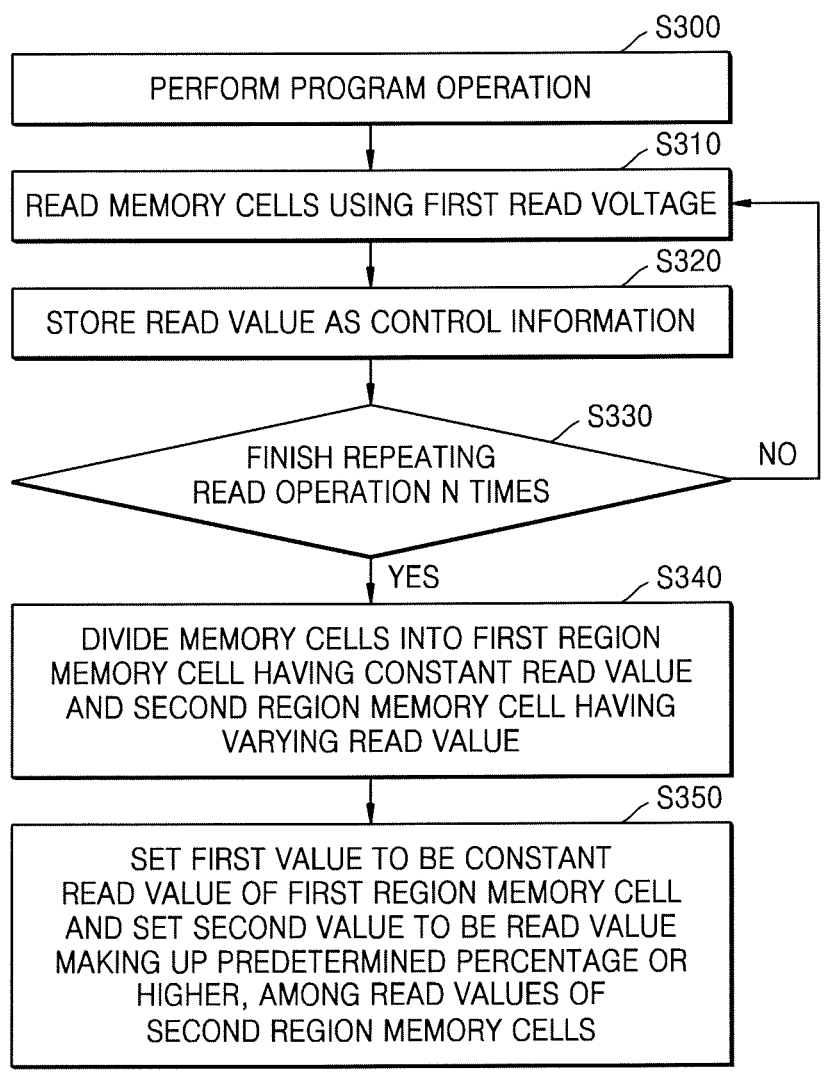
FIG. 9A is a flowchart illustrating a majority voting method according to an exemplary embodiment of the inventive concept.

The additional program storage unit 112 may be configured to store control information generated using an additional program method of FIG. 8A, and the majority voting storage unit 114 may be configured to store control information generated using a majority voting method of FIG. 9A. The error syndrome storage unit 116 may be configured to store control information generated using an error syndrome method of FIG. 10A, and the slow cell storage unit 118 may be configured to store control information generated using a slow cell method of FIG. 12.

Figure 6:
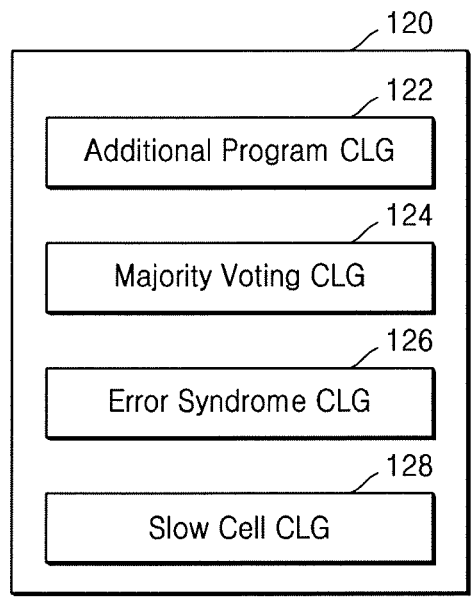
FIG. 6 is a block diagram of a control logic of FIG. 3, according to an exemplary embodiment of the inventive concept.

FIG. 6 is a block diagram of the control logic 120 of FIG. 3, according to an exemplary embodiment of the inventive concept.

Referring to FIG. 6, the control logic 120 may include at least one of an additional program control logic 122, a majority voting control logic 124, an error syndrome control logic 126, and a slow cell control logic 128. However, in an embodiment of the inventive concept, the control logic 120 is included in the flash memory device 200 of FIG. 4. The additional program control logic 122 may be configured to divide selected specific memory cells into at least one first region memory cell and at least one second region memory cell, and control a read value of each of the first and second region memory cells to be set to a first value or a second value, based on control information generated using the additional program method of FIG. 8A. The majority voting control logic 124 may be configured to divide memory cells in which input data is programmed, into at least one first region memory cell and at least one second region memory cell, and set a read value of each of the first and second region memory cells to a first value or a second value, based on control information generated using the majority voting method of FIG. 9A.

Figure 10A:
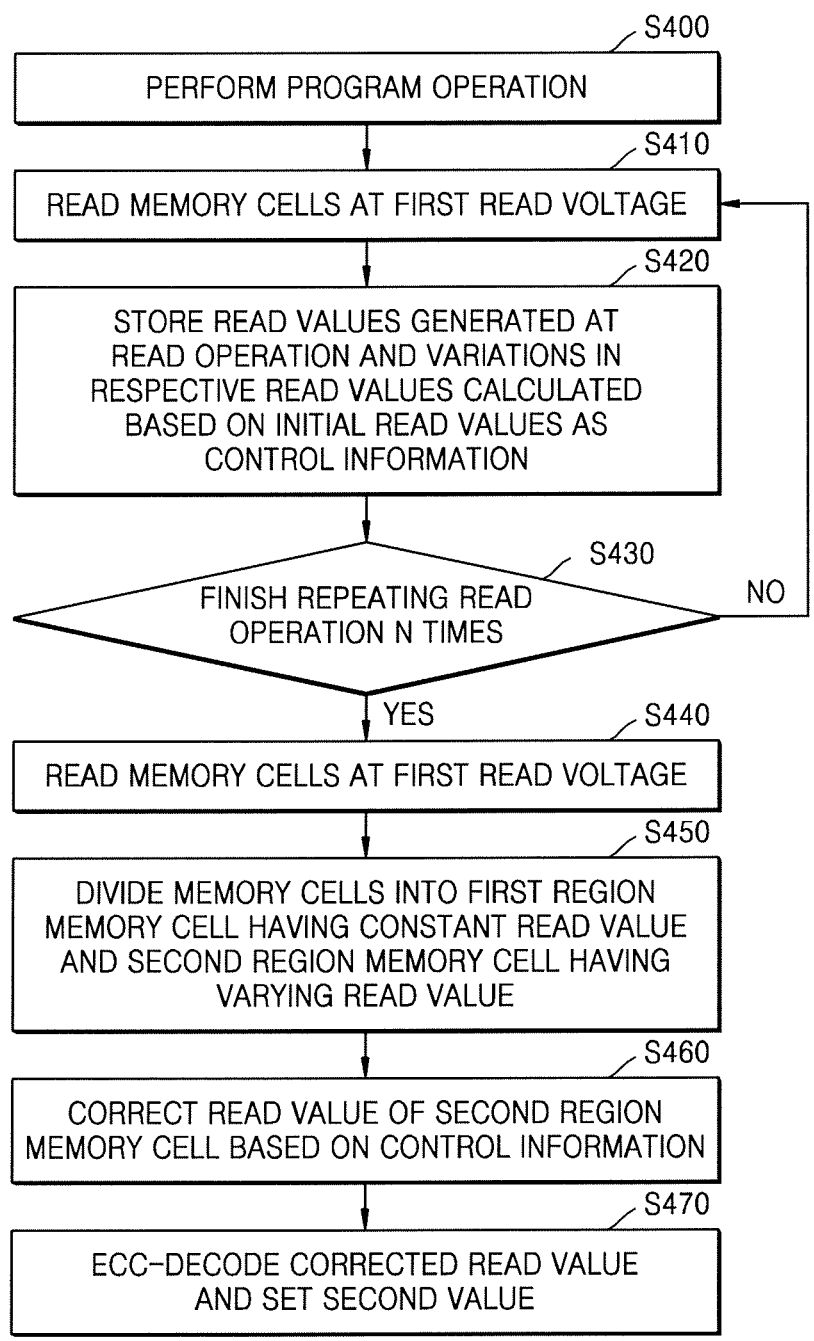
FIG. 10A is a flowchart illustrating an error syndrome method according to an exemplary embodiment of the inventive concept.

Based on control information generated using the error syndrome method of FIG. 10A, the error syndrome control logic 126 may be configured to divide memory cells in which input data is programmed, into at least one first region memory cell and at least one second region memory cell, control correction of an error vector of a read value of one of the first region memory cell and the second region memory cell, and control a read value of each of the first and second region memory cells to be set to a first value or a second value.

Figure 12:
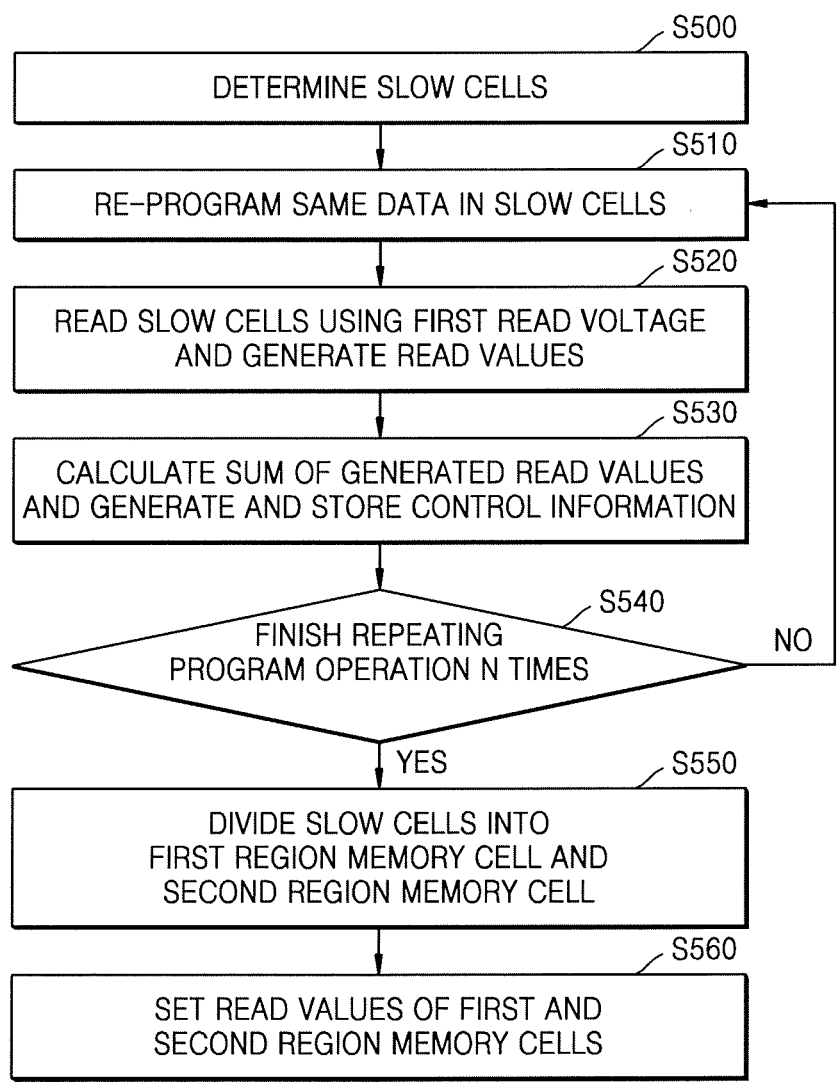
FIGS. 12 and 13 are flowcharts illustrating a slow cell method according to an exemplary embodiment of the inventive concept.
Figure 13:
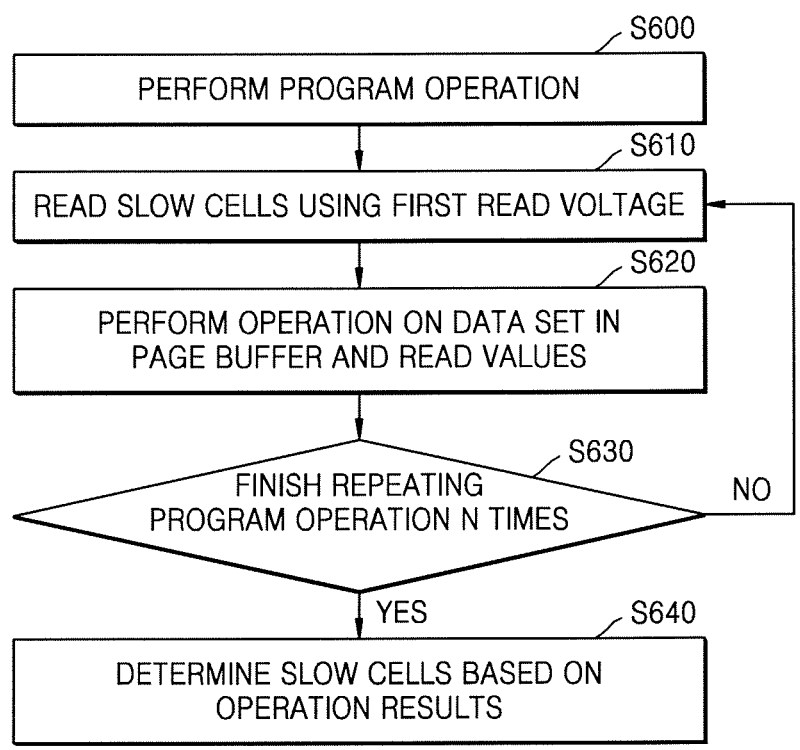

The slow cell control logic 128 may control a slow cell determination method of FIG. 13. Also, the slow cell control logic 128 may be configured to determine slow cells out of memory cells in which input data is programmed, divide the slow cells into at least one first region memory cell and at least one second region memory cell, and control a read value of each of the first and second region memory cells to be set to a first value or a second value, based on control information generated using a slow cell method of FIG. 12. For example, the slow cells may be cells that have a response speed that is lower than a certain threshold. Control operations of the control logic 120 will be described in detail below.

An example in which the control information storage unit 110 of the controller 100 is embodied apart from the control logic 120 has been described above, but the inventive concept is not limited thereto.

Figure 7:
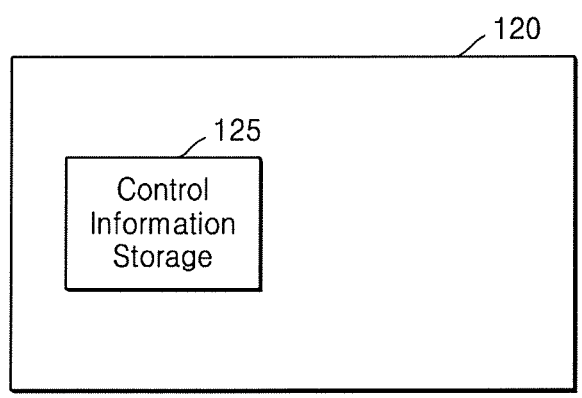
FIG. 7 is a block diagram of a control logic according to an exemplary embodiment of the inventive concept.

FIG. 7 is a block diagram of a control logic 120 according to an exemplary embodiment of the inventive concept.

Referring to FIG. 7, a control information storage unit 125 may be included in the control logic 120. In FIG. 7, the control information storage unit 125 may be denoted by a different reference numeral from the control information storage unit 110 of FIG. 3 to be distinguished from the control information storage unit 110 of FIG. 3, but a structure and operations of the control information storage unit 125 of FIG. 7 may be the same as those of the control information storage unit 110 of FIG. 3.

Figure 8B:
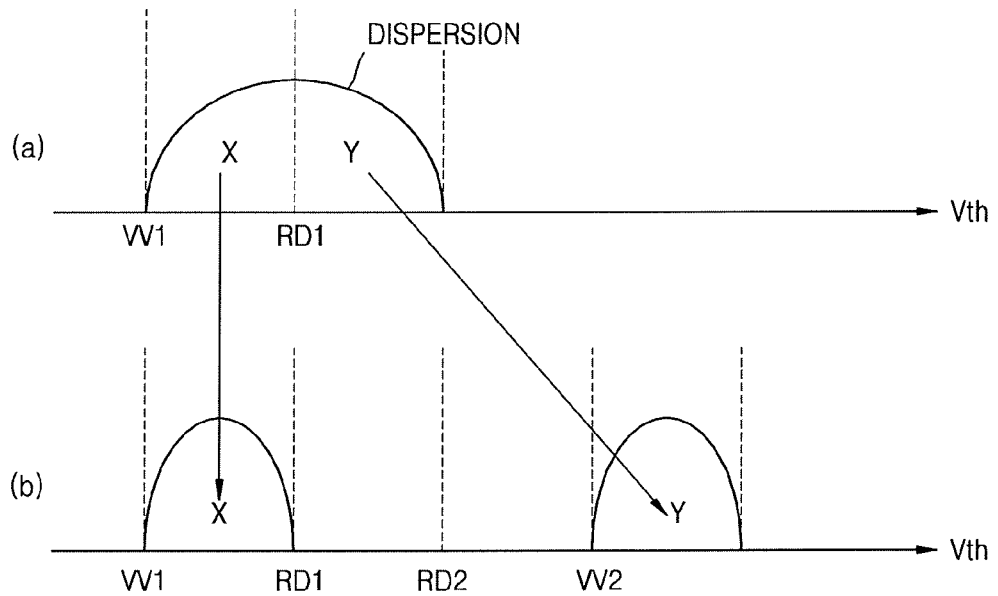
FIG. 8B illustrates a threshold voltage dispersion of memory cells programmed using the additional program method of FIG. 8A.

FIG. 8A is a flowchart illustrating an additional program method according to an exemplary embodiment of the inventive concept, and FIG. 8B illustrates a threshold voltage dispersion of memory cells programmed using the additional program method of FIG. 8A.

Referring to FIG. 8A, according to the method of FIG. 1, a flash memory device receives an authentication challenge, and specific memory cells are selected from the flash memory device in response to the authentication challenge. Pieces of input data are firstly programmed into the selected memory cells, respectively (S200). The pieces of the input data respectively programmed into the selected specific memory cells may be the same as one another, and each of the pieces of input data may be at least one bit.

As an example, all the input data may be 0. Accordingly, to program the selected specific memory cells with 0, all data may be set as 0 in a page buffer. The selected specific memory cells programmed with 0 may form a single threshold voltage dispersion.

A first read voltage is applied to the memory cells having the threshold voltage dispersion to read the memory cells to generate and store control information (S210). According to an exemplary embodiment of the inventive concept, the first read voltage is a value corresponding to a median value among threshold voltages of the selected specific memory cells. Information regarding memory cells having higher or lower threshold voltages than the first read voltage may be generated as the control information. In exemplary embodiments of the inventive concept, the control information may be information regarding positions of cells, like address information regarding each of the memory cells.

A second program operation is performed based on the control information so that the memory cells are divided into at least one first region memory cell and at least one second region memory cell (S220). The control information may be information regarding positions of cells having lower and higher threshold voltages than the first read voltage. In an exemplary embodiment, based on the control information, the first region memory cells are set to the specific memory cells having a lower threshold voltage than the first read voltage, while the second region memory cells are set to the specific memory cells having a higher threshold voltage than the first read voltage. However, in another embodiment, the first region memory cells are set to the specific memory cells having a higher threshold voltage than the first read voltage, and the second region memory cells are set to the specific memory cells having a lower threshold voltage than the first read voltage.

Operation S220 may include re-programming a memory cell of a specific region. The memory cell of the specific region may be a first region memory cell or a second region memory cell. Hereinafter, an embodiment in which the second region memory cell is re-programmed will be described. During the re-program operation, the same data as the input data programmed during the first program operation is programmed into the second region memory cell, and a re-program voltage having a larger magnitude than a program voltage applied during the first program operation is applied. The re-program voltage may have such a magnitude as to distinguish a dispersion of threshold voltages of the first region memory cell from a dispersion of threshold voltages of the second region memory cell. When the re-program operation is performed, the dispersion of the threshold voltages of the second region memory cell may wholly move by as much as a magnitude corresponding to a difference between the program voltage and the re-program voltage. Thus, the dispersion of threshold voltages of the second region memory cell may be formed apart from the dispersion of threshold voltages of the first region memory cell. However, as described above, the first region memory cell may also be re-programmed so that a dispersion of threshold voltages of the first region memory cell can be formed apart from a dispersion of threshold voltages of the second region memory cell.

A second read voltage is applied to the first region memory cells and the second region memory cells to generate read values, and the read values of the first region memory cells and the second region memory cells are set to a first value and a second value, respectively (S230). In an embodiment of the inventive concept, the second read voltage is higher than a threshold voltage of the first region memory cells and lower than a threshold voltage of the second region memory cells. When the second region memory cell is re-programmed, a cell having a higher threshold voltage than the second read voltage may be the second region memory cell, and a cell having a lower threshold voltage than the second read voltage may be the first region memory cell. When the first and second region memory cells are read using the second read voltage, a read value of the first region memory cell may be set to the first value, and a read value of the second region memory cell may be set to the second value. In an embodiment, as described above, when programmed input data is 0, the first value is 1, and the second value is 0.

That is, when each of selected specific memory cells is read using the second read voltage, a constant first value or second value may be set to the read value. An authentication response may be generated by a combination of the first value and the second value. However, the authentication response may be generated by only one of the first value or only one of the second value. The generated authentication response may be output in response to an authentication challenge.

The additional program method according to an embodiment of the inventive concept may prevent occurrence of a phenomenon where even if the first region memory cell is read as 0 and the second region memory cell is read as 0 due to the first read voltage, threshold voltages of the memory cells are read as erroneous values under the influence of charge loss and program disturbance. Accordingly, even if influenced by charge loss or program disturbance, threshold voltages of the memory cells programmed into each flash memory device to exhibit proper physical properties may output the same authentication response in response to an authentication challenge every time.

Also, in an exemplary embodiment, the method may further include storing the authentication response generated by combining the first and second values set in operation S230. When the same authentication challenge occurs, the stored authentication response may be directly output, and a prompt response may be promoted.

Referring to FIG. 8B, (a) indicates a dispersion of threshold voltages of programmed memory cells when the first program operation referenced in S200 is performed. The dispersion of the threshold voltages may be read as a first read voltage RD1. In this case, the first read voltage RD1 may be a median value in the dispersion of the threshold voltages of the programmed memory cells. In other words, the first read voltage RD1 may correspond to a value by which the dispersion of the threshold voltages of the programmed memory cells, which has a symmetrical structure, is halved. A median value in a dispersion of threshold voltages of programmed memory cells, which is described above or will be described below, may be interpreted as having the above-described meaning. Accordingly, programmed memory cells having higher threshold voltages than the first read voltage RD1 may be re-programmed during or after operation S220. However, the inventive concept is not limited to the present embodiment, and programmed memory cells having lower threshold voltages than the first read voltage RD1 may be re-programmed.

Referring to FIG. 8B, (b) indicates that the programmed memory cells are re-programmed and divided into a first region memory cell X and a second region memory cell Y. During S230, each of the first region memory cell X and the second region memory cell Y may be read using a second read voltage RD2 and set such that the first region memory cell X is read as a first value and the second region memory cell Y is read as a second value every time. In an exemplary embodiment, the second read voltage RD2 has a voltage level higher than a threshold voltage of the first region memory cell X and lower than a threshold voltage of the second region memory cell Y. Also, the definitions of the first and second region memory cells X and Y may be changed.

FIG. 9A is a flowchart illustrating a majority voting method according to an exemplary embodiment of the inventive concept, and FIG. 9B is a diagram showing a table of the majority voting method shown in FIG. 9A.

Referring to FIG. 9A, selected specific memory cells are programmed in response to an authentication challenge (S300). Since the program operation S300 is the same as the program operation of FIG. 8A, descriptions thereof are omitted. Thereafter, a dispersion of the selected specific memory cells is read using a first read voltage to generate read values (S310), and the read values of the selected specific memory cells are generated as control information and stored (S320). In an exemplary embodiment, the first read voltage is a median value in threshold voltages of the selected specific memory cells. Whenever memory cells are read, generated read values may be stored in a control information storage unit. Operation S310 of reading the dispersion of the selected specific memory cells using the first read voltage and operation S320 of storing the generated read values as the control information may be repeated N times (S330). As a result, N read values obtained by reading the selected specific memory cells may form the control information and be stored in the control information storage unit. In an exemplary embodiment, N may be at least 2.

Each of the programmed memory cells may include memory cells having constant read values and memory cells of which read values are not constant but vary according to each read step. When the read values of the memory cells are not constant, inconsistent authentication responses may occur. On the basis of the control information including read values obtained by reading the respective memory cells N times (e.g., to generate a history), while the respective memory cells are read N times, a memory cell having a constant read value may be divided into a first region memory cell, and a memory cell having a varying read value may be divided into a second region memory cell (S340). However, the inventive concept is not limited to the present embodiment, and the definitions of the first and second region memory cells may be exchanged. Subsequently, a first value is set to be the constant read value of the first region memory cell, and a second value is set to be a read value making up a predetermined percentage or higher, among the read values of the second region memory cell (S350).

In an exemplary embodiment, an authentication response generated by combining the set first and second values is stored in a register. When the same authentication challenge is generated using the stored authentication response, the stored authentication response may be directly output without performing the majority voting method described in operations S300 to S350.

Operation S350 of setting the first value and the second value will now be described with reference to FIG. 9B. Memory cells other than memory cells C, D, and E have constant read values, which are obtained by reading the memory cells N times. For example, since a memory cell A has a constant read value of 1, and a memory cell B has a constant read value of 0, the memory cells A and B correspond to the first region memory cells. The first value of each of the first region memory cells may be set according to the constant read value. For instance, the first value of the memory cell A may be set to be 1, and the first value of the memory cell B may be set to be 0.

Since read values obtained by reading the memory cells C, D, and E, N times are not constant, the memory cells C, D, and E correspond to the second region memory cells described in the previous embodiment. The second value of each of the second region memory cells may be set to be a read value making up a predetermined percentage (e.g., 50%) or higher from among read values obtained by reading the corresponding second region memory cell several times. For example, when 51% of the read values are 0 and 49% of the read values are 1, the second value may be set to 0. In an exemplary embodiment, the predetermined percentage is 50%. In an exemplary embodiment, for example, since the memory cell C has a read value of 0 in a percentage of 50% or higher, the second value of the memory cell C is set to be 0. Similarly, the second value of the memory cell D may be set to be 0. Since the memory cell E has a read value of 1 in a percentage of 50% or higher, the second value of the memory cell E is set to be 1.

According to the above-described example, final read data regarding the memory cells is determined as "100010111" as shown in FIG. 9B, and transmitted as an authentication response. Accordingly, even if threshold voltages of memory cells programmed in each flash memory device to exhibit proper physical properties are not consistently read at a one-time read operation, the same authentication response may be output in response to the authentication challenge.

Figure 10B:
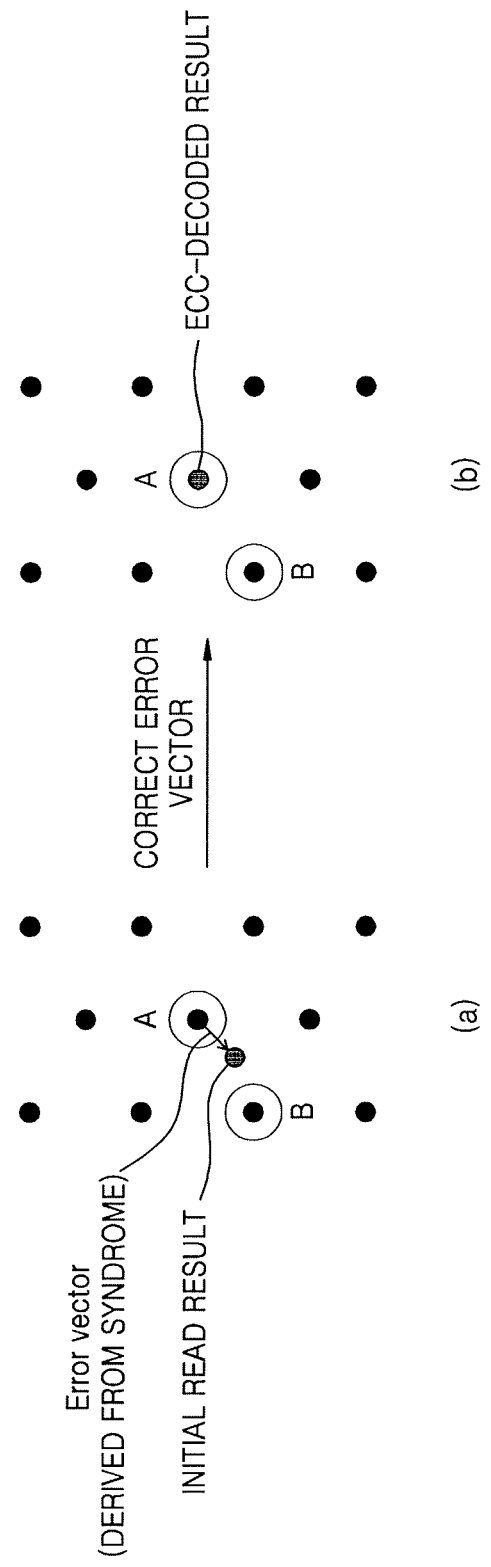
FIG. 10B is a diagram of the error syndrome method shown in FIG. 10A.

FIG. 10A is a flowchart illustrating an error syndrome method according to an exemplary embodiment of the inventive concept, and FIG. 10B is a diagram of the error syndrome method shown in FIG. 10A.

Referring to FIG. 10A, an operation S400 of programming memory cells and an operation S410 of reading the memory cells using a first read voltage are performed. Since the operations S400 and S410 are the same as the operations S300 and S310 of FIG. 9A, detailed descriptions thereof are omitted. Thereafter, variations in respective read values are calculated based on initial read values and stored as control information (S420). The initial read values may refer to read values of respective selected specific memory cells, which are firstly obtained using the first read voltage. The operation S410 of reading the memory cells using the first read voltage and the operation S420 of generating and storing the control information may be repeated N times (S430). That is, when the same data is programmed into the selected specific memory cells and the selected specific memory cells are read N times, the control information may include read values of the respective selected specific memory cells, which are generated at each read operation, and variations in the read values of the respective selected specific memory cells, and be stored in the control information storage unit. In an exemplary embodiment, the control information may also include information for determining an appropriate error correction code (ECC) based on statistics of the numbers of changed bits. The control information may include information for understanding errors in read values of specific memory cells. In an exemplary embodiment, the control information may include syndrome values indicating error vectors of read values of the specific memory cells based on the determined ECC. The error vectors may be corrected based on the control information including the syndrome values for the read values of the specific memory cells. The control information storage unit may be included in an ECC decoder.

After the operations of calculating and storing the control information are performed, selected specific memory cells are read again using the first read voltage (S440). A read value generated by reading the selected specific memory cells using the first read voltage may be regarded as a code word on the ECC decoder including errors. Thereafter, the selected specific memory cells are divided into at least one first region memory cell having a constant read value and at least one second region memory cell having a variable read value based on the stored control information (S450). However, in other embodiments, the definitions of the first and second region memory cells may be exchanged.

According to an exemplary embodiment of the inventive concept, the constant read value of the first region memory cell is set to a first value, and the read value of the second region memory cell corrects an error vector based on control information (S460). Also, a value obtained by ECC-decoding the correction result is again set to a second value (S470). An authentication response may be generated by combining the set first and second values. Furthermore, an authentication response may be generated using only the first value or only the second value. In an embodiment of the inventive concept, the same authentication response is output in response to an authentication challenge.

In addition, according to an exemplary embodiment, when an authentication challenge occurs, operations S440 to S470 are performed using the control information generated and stored in operations S410 to S430 without repeating operations S410 to S430. Thus, an authentication response may be rapidly generated and output in response to the authentication challenge.

Referring to FIG. 10B, in an exemplary embodiment, black dots shown in diagram (a) indicate appropriate ECC information, which may be generated as control information by calculating variations in respective read values based on initial read values, and determined based on the statistics of the numbers of changed bits in the operation S420 of storing the control information. An ECC may be stored in the control information storage unit, which may be included in the ECC decoder. In this case, the initial read value is not within ranges in which the ECC is found and corrects an error. For example, the initial read value is not within ranges A and B. Accordingly, to solve this problem, when an error vector is corrected using operation S460 based on syndromes corresponding to the variations in the respective read values obtained in operation S420, as shown in diagram (b), the error vector is corrected and the initial read value falls within the range A and is ECC-decoded during operation S470 using a code word having the range A.

Figure 11:
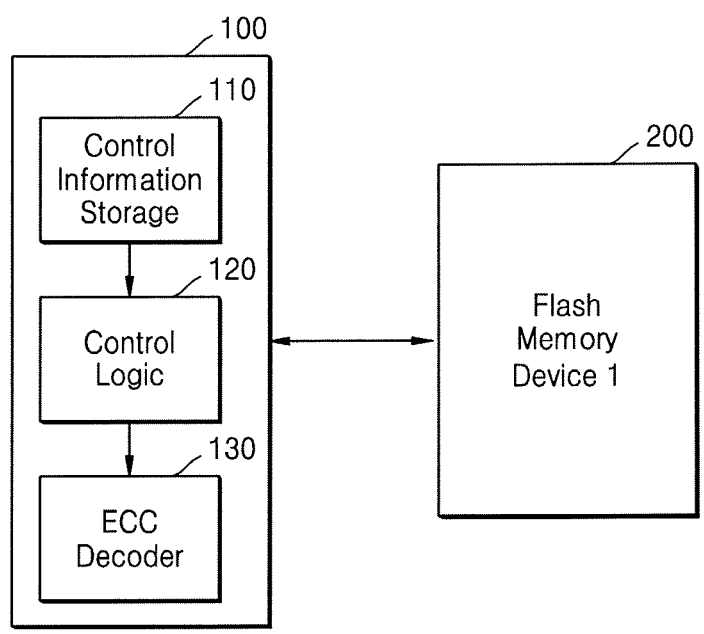
FIG. 11 is a block diagram of a controller of FIG. 10A, according to an exemplary embodiment of the inventive concept.

FIG. 11 is a block diagram of a controller configured to perform the error syndrome method of FIG. 10A, according to an exemplary embodiment of the inventive concept.

Referring to FIG. 11, the controller may further include an ECC decoder 130 unlike the controller of FIG. 3. The controller of FIG. 11 may be configured to embody the error syndrome method of FIG. 10A. For example, computer executable instructions performing the method of FIG. 10A may be stored in the controller of FIG. 11. In an embodiment of the inventive concept, the ECC decoder 130 is configured to correct an error vector of a read value of the second region memory cell and ECC-decode the corrected result, based on the control information generated in the method described in FIG. 10A. The control information may correspond to a syndrome described in FIG. 10A. Also, the information for determining an ECC, which is described in the error syndrome method of FIG. 10A, may be stored in the ECC decoder 130.

FIGS. 12 and 13 are flowcharts illustrating a slow cell method according to exemplary embodiments of the inventive concept.

Referring to FIG. 12, an operation S500 of determining slow cells is performed. Since the operation S500 will be described in detail below with reference to FIG. 13, detailed descriptions thereof are omitted here. Thereafter, pieces of input data are re-programmed into the slow cells, respectively (S510). All the pieces of input data may be the same as one another, and each of the pieces of input data may be at least one bit. The programmed slow cells are read using a first read voltage to generate read values (S520). The first read voltage may be a median value among threshold voltages of the slow cells or a smaller value than the median value.

The sum of read values of the respective slow cells are calculated and generated and stored as control information (S530). The operation S510 of programming the same data in the slow cells, the operation S520 of generating the read values of the slow cells, and the operation S530 of generating and storing the control information may be repeated N times (S540).

In an exemplary embodiment, data "0" is firstly programmed into the respective slow cells to read the respective slow cells. As a result, from among the slow cells, a first slow cell has a read value of 1, and a second slow cell has a read value of 0. Data "0" may be secondly programmed into the respective slow cells to read the respective slow cells. As a result, the first slow cell may have a read value of 1, and the second slow cell may have a read value of 1. Accordingly, the read values of the first slow cell and the second slow cell may be added up to 1 and 2, and the sums (i.e., 1 and 2) may be generated and stored as the control information. The slow cells may be divided into at least one first region memory cell and at least one second region memory cell based on the control information generated and stored in the above-described manner (S550). However, the inventive concept is not limited to the present embodiment, and the sums may be results obtained by operations other than simple additions. The sums may be specific values derived by performing the operations S510 to S540 once. The slow cells may be divided into the first region memory cells and the second region memory cells based on the sum of read values of reference slow cells. The reference slow cells may be slow cells having a specific threshold voltage among the slow cells. The first region memory cells may be slow cells having read values of which the sum is smaller than the sum of the read values of the reference slow cells. The second region memory cells may be slow cells having read values of which the sum is larger than the sum of the read values of the reference slow cells. However, the inventive concept is not limited to the present embodiment, and the definitions of the first region memory cell and the second region memory cell may be exchanged.

Subsequently, the read values of the first region memory cell and the second region memory cell are set to a first value and a second value, respectively (S560). In an exemplary embodiment, the first value is 0, and the second value is 1. Alternatively, the first value may be 1, and the second value may be 0. An authentication response may be generated and output in response to an authentication challenge by combining the set first and second values. In an exemplary embodiment, an authentication response may be generated and output using only the first value or only the second value.

In an exemplary embodiment of the inventive concept, the authentication response may be stored in a register. When the same authentication challenge occurs, the stored authentication response may be directly output without performing the slow cell method described in the operations S500 to S560.

FIG. 13 is a flowchart illustrating a method of determining slow cells in the slow cell method shown in FIG. 12 according to an exemplary embodiment of the inventive concept. An operation S600 of programming slow cells and an operation S610 of reading the slow cells using a first read voltage are performed. However, since the operations S600 and S610 are the same as the operations S300 and S310 of FIG. 9A, detailed descriptions thereof are omitted. To program input data into selected specific memory cells, an operation is performed on the input data set in a page buffer and the read values generated in the operation S610 of reading the memory cells using the first read voltage (S620). In an exemplary embodiment, the operation is a logic AND operation. For example, when all the input data is the same 1-bit data and set to be 1 and the read value is 1, a logic AND is performed on the input data and the read value to obtain a result value of 1. Conversely, when the read value is 0, a logic AND is performed on the input data and the read value to obtain a result value of 0. The operation S600 of programming the memory cells, the operation S610 of reading the memory cells using the first read voltage, and the operation S620 of performing an operation on the input data set in the page buffer and the read value is repeated N times (S630).

Cells continuously having read values of 1, among the selected specific memory cells, are determined as slow cells based on result values of the respective selected specific memory cells obtained due to the above-described operations (S640). For example, when the memory cells are programmed N times during operation S630) memory cells always having result values of 1 are determined as slow cells. The operation S640 of determining the slow cells may include performing a logic AND on all read result values obtained after each program operation. Due to the AND operation, it may be ascertained whether or not the memory cells are slow cells. According to an exemplary embodiment, results obtained by determining the slow cells in FIG. 13 may be stored in the register. When the same authentication challenge occurs, the operations S600 to S640 of determining the slow cells may be omitted using the stored determination results.

Figure 14:
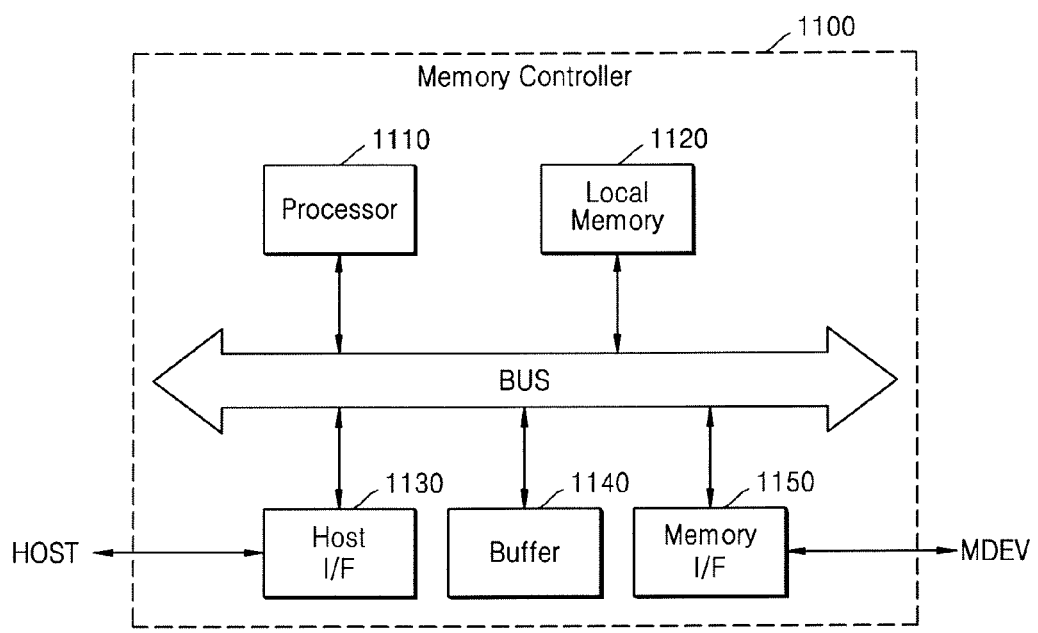
FIG. 14 is a diagram of an example of a controller of FIG. 2.

FIG. 14 is a diagram of an example of the controller of FIG. 2.

Referring to FIG. 14, a memory interface unit 1150, a local memory 1120, a buffer 1140, and a processor 1110 are connected to a bus BUS.

A host interface unit 1130 may interface with an external host apparatus HOST. For example, the host interface unit 1130 may provide a serial advanced technology attachment (SATA) or serial attached SCSI (SAS) protocol interface. However, the inventive concept is not limited thereto. In addition to the SATA or SAS interface, the host interface unit 1130 may interface with the host apparatus HOST through one of various interface protocols, such as a universal serial bus (USB), a man machine communication (MMC), peripheral component interconnect-express (PCI-E), parallel-ATA (PATA), a small computer system interface (SCSI), an enhanced small device interface (ESDI), and an intelligent drive electronics (IDE).

The memory interface unit 1150 may interface with a memory device MDEV to program or read data in or from the memory device MDEV in response to a challenge from the host apparatus HOST. For instance, when a logic block address transmitted from the host apparatus HOST is converted into a physical address of a page of the memory device MDEV, the memory interface unit 1150 may provide the conversion result to the memory device MDEV.

The buffer 1140 may be used to facilitate transmission of data between the host apparatus HOST and the memory device MDEV. For example, the buffer 1140 may temporarily store data to be programmed into the memory device MDEV, in response to the challenge from the host apparatus HOST. Alternatively, the buffer 1140 may temporarily store data to be read from the memory device MDEV in response to the challenge from the host apparatus HOST. The buffer 1140 may be embodied by a volatile memory, such as a dynamic random access memory (DRAM) or a static RAM (SRAM), or a non-volatile memory, such as a magnetic RAM (MRAM), a phase-change RAM (PRAM), a ferroelectric RAM (FRAM), or a flash memory.

Data and a control module or a control program, which are used for the controller 1100 to control the challenge of the host apparatus HOST to be processed in the memory device MDEV, may be loaded or stored in the local memory 1120. For example, firmware may be stored in the local memory 1120. The firmware may control a normal read command RCMD_N and a soft decision command RCMD_S according to the above-described embodiment and the settings of read voltage levels corresponding thereto.

In addition, a mapping table to which an operating system and address mapping may refer may be stored or loaded in the local memory 1120. Similar to the buffer 1140, the local memory 1120 may be embodied by a volatile memory, such as a DRAM or a SRAM, or a non-volatile memory, such as an MRAM, a PRAM, an FRAM, or a flash memory. However, a local memory forming firmware may be embodied by a non-volatile memory. The local memory 1120 may be embodied by at least one homogenous or heterogeneous memory.

The processor 1110 may control operations of respective components of the controller 1100, analyze and execute the control module or control program stored or loaded in the local memory 1120, and process the challenge from the host apparatus HOST.

Figure 15:
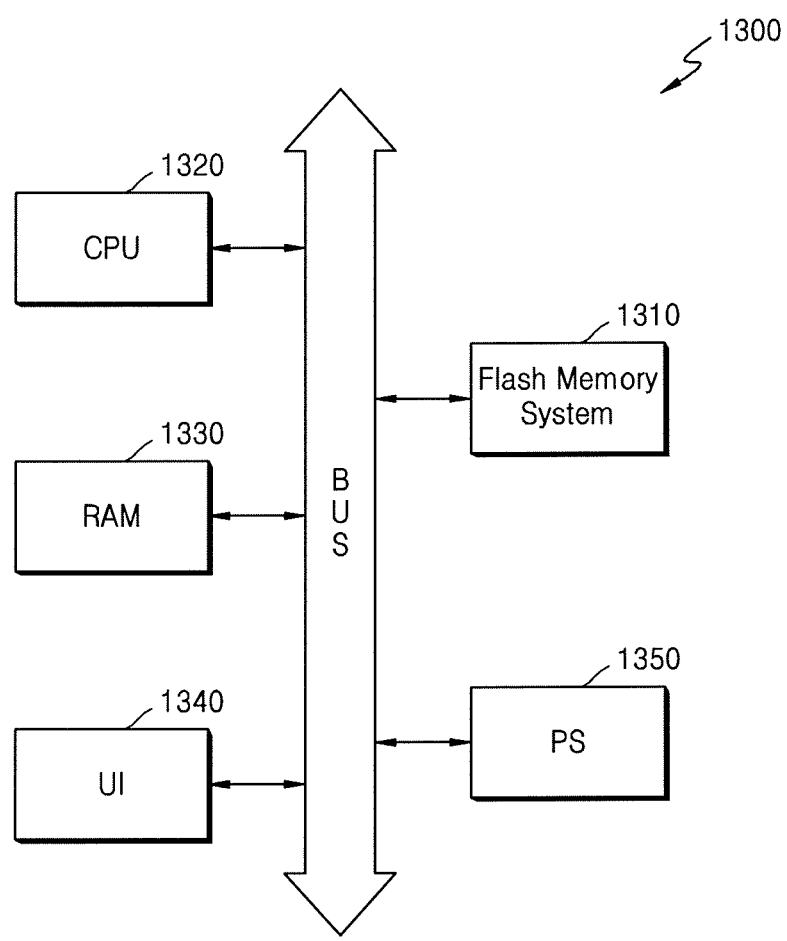
FIG. 15 is a diagram of a computer device including the flash memory system of FIG. 2.

FIG. 15 is a diagram of a computer system 1300 including the flash memory system of FIG. 2, according to exemplary embodiment of the inventive concept.

Referring to FIG. 15, the computer system 1300 according to an exemplary embodiment of the inventive concept includes a processor (e.g., a central processing unit (CPU)) 1320, a user interface (UI) 1340, and a flash memory system 1310, which may be electrically connected to a bus BUS. The flash memory system 1310 may be the flash memory system of FIG. 2. The computer system 1300 according to the exemplary embodiment of the inventive concept may further include a power supply (PS) 1350. Also, the computer system 1300 according to the exemplary embodiment of the inventive concept may further include a volatile memory device (e.g., a RAM 1330) configured to transmit and receive data between the processor 1320 and the flash memory system 1310.

When the computer system 1300 according to the exemplary embodiment of the inventive concept is a mobile device, a battery configured to supply an operating voltage to the computer system 1300 and a modem, such as a baseband chipset, may be further provided. Also, it will be understood by one of ordinary skill in the art that the computer system 1300 according to the exemplary embodiments of the inventive concept may further include an application chipset, a camera image processor (CIS), a mobile DRAM, etc.

While the inventive concept has been particularly shown and described with reference to exemplary embodiments thereof, it will be understood that various changes in form and details may be made therein without departing from the spirit and scope of the inventive concept. For example, the above-described flash memory may be a 2-dimensional NAND flash memory. Also, according to the embodiment shown in FIG. 1, input data is programmed in response to an authentication challenge, but the inventive concept is not limited thereto. For example, the operation S120 of FIG. 1 of programming during the fabrication of a flash memory device, and programming results may be stored in a register of the flash memory device. Operations performed after the operation S120 of FIG. 1 may be performed in response to a subsequent authentication challenge.

What is claimed is:

1. A method of operating a flash memory system, comprising:
    selecting memory cells of a flash memory in response to an authentication challenge;
    performing at least one program operation on the selected memory cells and performing a plurality of read operations on the selected memory cells after each respective program operation to generate a plurality of read operation results;
    generating control information necessary for dividing the selected memory cells into at least one first region memory cell and at least one second region memory cell based on the plurality of read operation results;
    dividing the selected memory cells into the at least one first region memory cell and the at least one second region memory cell based on the control information;
    performing a correction operation on read values of the at least one second region memory cell based on the control information; and
    generating an authentication response in the response to the authentication challenge based on read values of the at least one first region memory cell and the read values of the at least one second region memory cell.

2. The method of claim 1, wherein the generating of the control information comprises:
    reading the selected memory cells using a first read voltage; and storing information indicating which cells among the selected memory cells have a threshold voltage higher or lower than the first read voltage, as the control information.

3. The method of claim 1, wherein the generating of the control information comprises:
reading the selected memory cells at least twice to generate at least two read values; and
storing the at least two generated read values as the control information,
wherein the dividing of the selected memory cells into the at least one first region memory cell and the at least one second region memory cell based on the control information comprises:
setting at least one memory cell, which is read at least twice to generate a constant read value, as the at least one first region memory cell; and
setting at least one memory cell, which is read at least twice to generate a varying read value, as the at least one second region memory cell, and
wherein the performing of the correction operation and the generating of the authentication response in the response to the authentication challenge comprise:
setting the constant read value of the at least one first region memory cell as the first value; and
setting a read value making up a predetermined percentage or higher from among read values of the at least one second region memory cell, as the second value.

4. The method of claim 1, wherein the generating of the control information, and the dividing of the selected memory cells into the at least one first region memory cell and the at least one second region memory cell based on the control information comprises:
reading the selected memory cells at least twice;
setting at least one memory cell, which is read at least twice to generate a constant read value among the selected memory cells, as the at least one first region memory cell; and
setting at least one memory cell, which is read at least twice to generate a varying read value among the selected memory cells, as the at least one second region memory cell,
wherein the dividing of the selected memory cells into the at least one first region memory cell and the at least one second region memory cell based on the control information further comprises:
setting the constant read value of the at least one first region memory cell to the first value;
correcting an error in the varying read value of the at least one second region memory cell based on the control information;
error-correction-code (ECC)-decoding the corrected varying read value of the at least one second region memory cell; and
setting an ECC-decoded result value to the second value, wherein the control information includes information indicating variations in respective read values of the selected memory cells based on one of the respective read values of the selected memory cells, and the respective read values of the selected memory cells are obtained by the reading of the selected memory cells at least twice.

5. The method of claim 4, wherein the correcting of the error in the varying read value of the at least one second region memory cell based on the control information comprises correcting an error vector of the read value of the at least one second region memory cell and setting the corrected error vector as an ECC code word.

6. The method of claim 1, wherein the performing of the at least one program operation on the selected memory cells comprises programming pieces of input data into the selected memory cells and determining slow cells, wherein the dividing of the selected memory cells into the at least one first region memory cell and the at least one second region memory cell based on the control information comprises dividing the determined slow cells into the at least one first region memory cell and the at least one second region memory cell.

7. The method of claim 6, wherein the determining of the slow cells comprises:
reading the respective memory cells in which the pieces of the input data are programmed using a first read voltage at least once;
comparing the pieces of the input data with read values of each of the memory cells read at the first read voltage each time the memory cells are read; and
determining the slow cells based on a result of the comparing.

8. The method of claim 6, further comprising programming pieces of the same input data into each of the memory cells at least once, wherein the reading of the selected memory cells to generate the control information comprises:
reading respective slow cells in which the pieces of the input data are programmed, using a first read voltage each time the pieces of the same data are programmed into each of the memory cells; and
calculating a sum of generated read values of the respective slow cells to store the control information each time the determined slow cells are read, and
wherein the dividing of the selected memory cells into the at least one first region memory cell and the at least one second region memory cell based on the control information comprises:
setting at least one slow cell having read values of which a sum is smaller than a sum of read values of a reference slow cell having a specific threshold voltage among the slow cells, as the at least one first region memory cell; and
setting at least one slow cell having read values of which the sum is larger than the sum of the read values of the reference slow cell having the specific threshold voltage among the slow cells, as the at least one second region memory cell.

9. A method of preventing physical cloning by using a flash memory, comprising:
transmitting, by a source external to the flash memory, an authentication challenge to the flash memory;
selecting memory cells of the flash memory based on the authentication challenge;
performing at least one program operation on the selected memory cells and performing a plurality of read operations on the selected memory cells after each respective program operation to generate a plurality of read operation results;
generating control information necessary for dividing the selected memory cells into at least one first region memory cell and at least one second region memory cell based on the plurality of read operation results;
dividing the selective memory cells into the at least one first region memory cell and the at least one second memory cell based on the control information;

performing a correction operation on read values of the at least one second region memory cell based on the control information; and generating an authentication response in the response to the authentication challenge based on read values of the at least one first region memory cell and the read values of the at least one second region memory cell.

10. The method of claim 9, wherein the performing of the at least one program operation on the selected memory cells comprises:

programming pieces of input data into the selected memory cells;

reading memory cells in which the pieces of the input data are programmed using a first read voltage at least once;

comparing the pieces of the input data with the read values of the read memory cells which correspond to the pieces of data and into which the pieces of data are to be respectively programmed using the first read voltage, each time the selected memory cells are read; and determining slow cells based on a result of the comparing, wherein the generating of the control information comprises:

reading respective slow cells corresponding to pieces of data programmed into the slow cells using a first read voltage each time the input data is programmed into the respective memory cells; and calculating a sum of generated read values of the respective slow cells to store the control information each time the determined slow cells are read, and wherein the dividing of the selected memory cells into the at least one first region memory cell and the at least one second region memory cell based on the control information comprises:

setting at least one slow cell having read values of which a sum is smaller than a sum of read values of a reference slow cell having a specific threshold voltage among the slow cells, as the at least one first region memory cell; and setting at least one slow cell having read values of which a sum is larger than the sum of the read values of the reference slow cell having the specific threshold voltage among the slow cells, as the at least one second region memory cell.

11. A method of operating a flash memory system, comprising:

selecting, by a controller of the system, memory cells of a flash memory of the system in response to an authentication challenge;

performing, by the controller, at least one program operation on the selected memory cells and performing, by the controller, a plurality of read operations on the selected memory cells after each respective program operation to generate a plurality of read operation results;

generating, by the controller, control information based on a history of read values of the selected memory cells;

determining, by the controller, which of the selected memory cells have a constant value and a variable value based on the control information;

setting, by the controller, a first value for each memory cell determined to have the constant value to a value from the corresponding memory cell;

setting, by the controller, a second value for each memory cell determined to have the variable value to a constant value based on the control information; and generating, by the controller, an authentication response comprising the first values and the second values.

12. The method of claim 11, wherein the setting of the second value, comprises:

determining which of a first logic level and a second logic level occurs more often than a certain percentage in the history for a corresponding one of the memory cells determined to have the variable value; and setting the second value for the one memory cell to the logic level that is determined to occur more often than the percentage.

13. The method of claim 12, wherein the percentage is 50 percent.

14. The method of claim 11, wherein generating the authentication response comprising appending the first values and the second values according to an order in which the memory cells are selected.

* * * * *